United States Patent
Alvarez Valenzuela et al.

(10) Patent No.: US 11,837,969 B2
(45) Date of Patent: Dec. 5, 2023

(54) POWER CONVERTER AND METHOD FOR OPERATING THE POWER CONVERTER

(71) Applicant: Siemens Energy Global GmbH & Co. KG, Munich (DE)

(72) Inventors: Rodrigo Alonso Alvarez Valenzuela, Nuremberg (DE); Joerg Dorn, Buttenheim (DE); Yeqi Wang, Langensendelbach (DE); Kilian Dallmer-Zerbe, Bubenreuth (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 145 days.

(21) Appl. No.: 17/571,712

(22) Filed: Jan. 10, 2022

(65) Prior Publication Data
US 2022/0224243 A1     Jul. 14, 2022

(30) Foreign Application Priority Data
Jan. 8, 2021    (EP) ..................................... 21150635

(51) Int. Cl.
*H02M 7/219*      (2006.01)
*H02M 1/32*      (2007.01)

(52) U.S. Cl.
CPC ............. *H02M 7/219* (2013.01); *H02M 1/32* (2013.01)

(58) Field of Classification Search
CPC ................................ H02M 7/219; H02M 1/32
See application file for complete search history.

(56) References Cited

U.S. PATENT DOCUMENTS 10,074,988 B2 *   9/2018   Oates ........................ H02J 3/36
10,116,159 B1 *   10/2018   Li ........................... H02J 7/0068
(Continued)

FOREIGN PATENT DOCUMENTS

| WO | 2020125968 A1 | 6/2020 |
| WO | 2020233786 A1 | 11/2020 |
| WO | 2020244768 A1 | 12/2020 |

OTHER PUBLICATIONS

Beczkowski et al. "Complete Loss and Thermal Model of Power Semiconductors Including Device Rating Information", IEEE Transactions on Power Electronics, vol. 30, No. 5, May 2015.
(Continued)

*Primary Examiner* — Rafael O De Leon Domenech
(74) *Attorney, Agent, or Firm* — Laurence A. Greenberg; Werner H. Stemer; Ralph E. Locher

(57) ABSTRACT

A method operates a power converter having power converter arms, which are switchable between in each case an AC voltage side and a DC voltage side or connectable to phase lines of an AC voltage power supply system. Each power converter arm has a series circuit of switching modules each having a plurality of semiconductor switches and an energy store, in which at least one temperature value for the power converter is determined. A setpoint current limitation value is determined taking into consideration the temperature value, and a setpoint current value is determined taking into consideration the setpoint current limitation value. The temperature value, the arm setpoint current value, the arm actual current value and/or the arm setpoint current limitation value is time-integrated to form an arm integral value. When the arm integral value reaches or exceeds a predetermined arm integral threshold value, a protective measure is performed.

12 Claims, 5 Drawing Sheets

(56) References Cited

U.S. PATENT DOCUMENTS

| | | | |
|---|---|---|---|
| 2010/0020577 A1 | 1/2010 | Dommaschk et al. | |
| 2013/0234681 A1* | 9/2013 | Aiello | H02M 1/12 323/208 |
| 2013/0308235 A1* | 11/2013 | Davies | H02H 7/1257 361/62 |
| 2014/0016379 A1* | 1/2014 | Yamamoto | H02M 7/4835 363/37 |
| 2015/0162848 A1* | 6/2015 | Harnefors | H02M 7/217 363/78 |
| 2015/0171726 A1* | 6/2015 | Singh Riar | H02M 7/06 363/65 |
| 2016/0056728 A1* | 2/2016 | Zhang | H02M 1/0095 363/127 |
| 2016/0233762 A1* | 8/2016 | Mathew | H02M 7/4835 |
| 2016/0248321 A1* | 8/2016 | Srivastava | H02M 3/24 |
| 2016/0308357 A1* | 10/2016 | Yuan | H02M 1/12 |
| 2017/0163171 A1* | 6/2017 | Park | H02M 7/4835 |
| 2017/0271997 A1* | 9/2017 | Herold | B60M 3/00 |
| 2018/0034358 A1* | 2/2018 | Geske | H02M 7/797 |
| 2018/0062536 A1* | 3/2018 | Mondal | H02M 7/48 |
| 2018/0138826 A1* | 5/2018 | Jimichi | H02M 7/4835 |
| 2019/0165693 A1* | 5/2019 | Malipaard | H02M 7/4835 |
| 2019/0326770 A1* | 10/2019 | Ding | H02M 7/4835 |
| 2020/0076321 A1* | 3/2020 | Ding | H02M 7/4835 |

OTHER PUBLICATIONS

Alavi et al. "Assessment of Thermal Network Models for Estimating IGBT Junction Temperature of a Buck Converter", 8th Power Electronics, Drive Systems & Technologies Conference (PEDSTC 2017), Feb. 14-16, 2017, Ferdowsi University of Mashhad, Mashhad, Iran.

* cited by examiner

POWER CONVERTER AND METHOD FOR OPERATING THE POWER CONVERTER

CROSS-REFERENCE TO RELATED APPLICATION

This application claims the priority, under 35 U.S.C. § 119, of European Patent Application EP 21150635.7, filed Jan. 8, 2021; the prior application is herewith incorporated by reference in its entirety.

FIELD AND BACKGROUND OF THE INVENTION

The invention relates to a method for operating a power converter, which contains power converter arms. Each power converter arm has a series circuit of switching modules each having a plurality of semiconductor switches and an energy store, in which at least one temperature value of the power converter is determined on the basis of a state model of the power converter. At least one setpoint current limitation value is determined taking into consideration the temperature value, and a setpoint current value is determined taking into consideration the setpoint current limitation value. The power converter arms can be switchable, for example, between in each case a DC voltage side and an AC voltage side of the power converter (AC-DC converter), between in each case a first and a second AC voltage side of the power converter (AC-AC converter), between in each case a first and a second DC voltage side of the power converter (DC-DC converter) or else can be connectable to phase lines of an AC voltage power supply system.

Modern converters for high-voltage DC transmissions (HVDC transmission) are characterized by a high degree of efficiency with at the same time excellent capabilities in the case of dynamic processes and fault events. The design of the converter is in this case based on three concurrent optimization criteria: the behavior in the steady state (continuous operation state), the behavior in the case of dynamic processes and the behavior in the event of a fault. In the steady state operating mode, the converter is intended to be operated at the selected working point with as few losses as possible. In the case of dynamic processes and fault events, it is of high importance to reach the selected setpoint value quickly or to dynamically manage the fault, whereas the increased losses occurring in the process only play a subordinate role—these are only of significance for the protection of the converter. The converter is designed for steady state operation and is provided with additional switching modules in order to be able to be operated even in the case of dynamic processes and fault events. The converter is in this case not optimally utilized for each working point and operating mode. A determination of this semiconductor-internal temperature or losses using measurement technology is at present only possible with a very high degree of complexity or insufficient accuracy.

The losses of the semiconductors and the load limits thereof are generally determined using the data sheets from the manufacturer. With these, the working points of the converter are determined and the required hardware complexity is established. In this case, worst-case scenarios are used as a basis in the steady state operating mode. For fault scenarios, additional switching modules are installed in order to provide sufficient reserve for dynamic fault events and in order to be able to ensure passage through these fault events or to be able to manage them with the established design. In order to prevent overloading of the power converter, the setpoint current is limited. In particular, the setpoint current limitation value is preset by means of the power converter controller so that the setpoint current value does not exceed the setpoint current limitation value.

A method in accordance with the art is known from international patent disclosure WO 2020/125968 A1. In accordance with the known method, the limitation value is fixed in a time-dynamic fashion depending on a power converter temperature. The temperature value is obtained by means of suitable modelling (of the state model).

The object of the invention consists in proposing a method in accordance with the art which further improves the reliability of the power converter.

The object is achieved in the case of the method mentioned at the outset according to the invention by virtue of the fact that the temperature value for a power converter arm is calculated. An arm setpoint current limitation value is determined for the power converter arm depending on the temperature value, and in addition an arm setpoint current value is determined for the power converter arm taking into consideration the arm setpoint current limitation value thereof. The temperature value, the arm setpoint current value, the arm actual current value and/or the arm setpoint current limitation value or a variable derived therefrom is time-integrated so as to form an arm integral value. When the arm integral value reaches or exceeds a predetermined arm integral threshold value, a protective measure is initiated and expediently performed for protecting the power converter. The protective measure is suitably an adaptation of, in particular a reduction in, at least one of the arm setpoint current values and/or at least one of the arm setpoint current limitation values. Preferably, in each case one temperature value is calculated for each power converter arm, and arm setpoint current limitation values are determined for each power converter arm depending on the temperature values, and an arm setpoint current value is determined for each power converter arm taking into consideration the arm setpoint current limitation value thereof. At least one of the temperature values, at least one of the arm setpoint current values, the arm actual current values and/or at least one of the arm setpoint current limitation values or a variable derived therefrom is or are time-integrated so as to form at least one arm integral value. The time integration in each case expediently takes place using numerical integration.

Suitably, an arm manipulated voltage for the (or in each case one for each) power converter arm is determined taking into consideration the temperature value thereof, for which purpose an assigned arm manipulated voltage is determined from the arm setpoint current value and measured arm actual current value by means of a controller (if appropriate in each case for one power converter arm).

Owing to the additional time integration of the temperature, setpoint current or limitation value (or preferably the corresponding values for all of the power converter arms), protection of the power converter is ensured in the event of overload in fault events. According to the invention, it has been identified that short-term current or temperature changes are often acceptable during operation of the power converter. The thermal loadability of the power converter or the semiconductor thereof is given more effectively by a limit load integral threshold value specified, for example by the manufacturer, for the semiconductors (for example for a semiconductor in the form "allows 4 kA for at most 20 ms"). A risk for the operating capacity of the power converter therefore results when the determined integral value reaches or exceeds the limit load threshold value or a corresponding value (but not merely by short-term current or temperature peaks). The integral value I can be defined, for example, as I=int i^2*dt (where "int" denotes the integral symbol). The square of the current i (arm actual current, arm setpoint current or arm setpoint current limitation value) is approximately equivalent (proportional) to the absorbed energy. The integral value can be compared with an integral threshold value I0 (for example the limit load threshold value) specified by the manufacturer. The integration can expediently take place over the temporal length of a system period (for example 20 ms) of the AC voltage power supply system to which the power converter is connected during operation. This can correspond, for example, depending on the sampling rate of the current values or the temporal rate of the determination of the temperature or the limitation values, to an integration over 500 to 1000 individual values. With the method according to the invention, the power converter can be run in the event of dynamic processes and fault events at higher currents than in the case of a conservative design. In addition, sometimes there is also not the need to make available additional switching modules for fault events.

Preferably, the state model takes into consideration at least the following power converter variables when calculating the temperature values: energy store voltages, switching states and switching frequencies of at least some switching modules and arm voltages and arm currents of the relevant power converter arm(s). The state model can be implemented in a closed-loop control device of the power converter, in particular in a current control system. The state model preferably contains a temperature model, by means of which the instantaneous temperature or the corresponding instantaneous temperature value is calculated (in particular estimated). The temperature value of the power converter can in this case be a temperature value of an "average switching module". This means that a switching module which in the simplest case represents all of the switching modules of the power converter, suitably all of the switching modules of a power converter arm, is modelled in the temperature model. The temperature (temperature value) of a switching module is expediently in turn understood to be a mean temperature of the semiconductor or junctions thereof (junction temperature). At best, all of the junction temperatures of the average switching module (i.e. for a half-bridge the two IGBT and the two diode junction temperatures) are calculated and can be used correspondingly in the further processing. Methods for temperature or state modelling of semiconductors are known from the technical literature. Examples which can be mentioned here are the article by Beczkowski et al. "Complete Loss and Thermal Model of Power Semiconductors Including Device Rating Information", IEEE Transactions on Power Electronics, 2015, and the article by Alavi et al. "Assessment of thermal network models for estimating IGBT junction temperature of a buck converter", 2017 8th Power Electronics, Drive Systems & Technologies Conference (PEDSTC). The energy store voltage is the voltage instantaneously present at one of the energy stores of one of the switching modules. The energy store voltage can be detected by means of a suitable measuring apparatus at or in the switching module and transmitted to the closed-loop control device. The switching state of a switching module specifies whether the energy store of the switching module is located at that time in the current path of the power converter arm or is bypassed ("on" or "off"). The consideration of the switching state in the state model or temperature model is advantageous because the switching state specifies where in the power converter the temperature rises or losses arise at that time. The switching frequency is suitably defined as switching pair rate (number of switch-on operations+switch-off operations/time interval; time interval is, for example, equal to the system period). The consideration of the switching frequencies in the state model or temperature model is advantageous because the switching frequency influences the level of the switching losses. The arm voltage is the voltage which is instantaneously present at a power converter arm. The arm voltages are measured continuously for all power converter arms by means of voltmeters and can be transmitted to the closed-loop control device. The arm current is the current flowing instantaneously through the associated power converter arm. The arm current determines, inter alia, also the current flow direction and therefore, in the most favorable case, also which semiconductor is current-conducting (IGBT/diode). The arm currents of the power converter arms are likewise measured continuously by means of ammeters and can be transmitted to the closed-loop control device. A redundancy consumption value is, for example, conceivable as a further input parameter for the state model. The redundancy consumption value specifies how many switching modules in a power converter arm have already failed in the past or are faulty.

Preferably, the calculation of the temperature values is performed repeatedly at time intervals of less than 1 s, particularly preferably at time intervals of less than 100 microseconds. In this way, a calculation with a particularly fine resolution and therefore a particularly reliable calculation of the integral value is made possible.

The determination of the arm setpoint current limitation values is performed on the basis of a temperature/current characteristic and/or temperature control. In order to determine the arm setpoint current limitation values for a plurality of power converter arms, in principle in each case different characteristics or control specifications can be defined. In principle, the temperature value(s) is/are provided by means of the state model or the temperature model. The conversion of the temperature values into corresponding limitation values accordingly takes place, for example, using a separate algorithm (suitably within the control), by means of which the limitation values are fixed in such a way that a control error between a preset setpoint temperature and the temperature value is minimized. In order to convert the temperature values into limitation values, a corresponding (for example linear) characteristic can also be used.

In accordance with one embodiment of the invention, a loss value is provided for at least one, preferably for each power converter arm by means of the state model, wherein the loss value is a switching loss value, a wheeling loss value, an auxiliaries service loss value or a total loss value. The loss value can be calculated, for example, as an intermediate value in the determination of the temperature value. The switching loss value measures the switching losses of the semiconductor switches. The auxiliaries service loss value corresponds to the electrical losses in the switching module, for example in the event of self-discharge during operation. The total loss value is the sum of the remaining loss values. The loss values calculated in real time can advantageously be used as additional information in the current control. On the basis of an "averaged" loss model, the semiconductor losses are made available to the power converter controller as additional information, as a result of which the converter can be operated in the steady state adaptively for each working point with the lowest losses. In the case of dynamic processes and fault events, the converter sets itself correspondingly to higher currents.

Preferably, in each case one arm manipulated voltage is determined for each power converter arm taking into consideration the loss value thereof, wherein in particular associated arm manipulated voltages are determined by means of a controller from the arm setpoint current values and measured arm actual current values. The consideration of the loss value can take place, for example, by virtue of the fact that the closed-loop control device changes between different control and operating modes depending on the loss value. For example, the power converter is operated in a first mode when the loss value is below a loss threshold and is operated in a second mode when the loss value is equal to or higher than the loss threshold. The control of the arm currents can respond to the loss value by virtue of different control parameters being prioritized in the case of low loss values (below a loss threshold) than in the case of high loss values (at the loss threshold or higher than that).

Suitably, depending on the loss value, the power converter is operated in a continuous operation mode, in which the loss value is minimized, or in a loading mode, in which loading of the semiconductor switches or semiconductor diodes is reduced. In this way, advantageously an optimum can be achieved between the reliability of the power converter during operation (owing to lower semiconductor loading) and the power (owing to minimized losses). The loading of the semiconductor switches can be achieved, for example, by a reduction in the switching frequency of the relevant semiconductor switches or by injection (generation) of higher harmonics (onto the generated AC voltage). The loss value can be reduced, for example, by a higher voltage at the same current.

In accordance with one embodiment of the invention, associated arm manipulated voltages are determined from the arm setpoint current values and measured arm actual current values by means of a controller, and switching commands for the switching modules are established from the arm manipulated voltages, wherein when the switching commands are established, the loss values are used as an (additional) optimization criterion. A switching command specifies that the relevant switching module should be or is switched on or off. The conversion of the arm manipulated voltages into switching commands for individual switching modules in the relevant power converter arm can be performed, for example, by means of a suitable module management system. In this case, optimization criteria given by the selection of the switching modules to be switched can be taken into consideration. One of the optimization criteria may be balancing of the energy stores with the aim of uniformly charging the energy stores. Correspondingly, switching commands for the switching modules can be established from the arm manipulated voltages using a balancing algorithm for balancing energy store voltages. Suitable balancing algorithms are in principle known from the prior art. A conceivable criterion for this is, for example, a discrepancy between an instantaneous energy store voltage and a mean energy store voltage in the power converter arm.

In addition, the invention relates to a power converter, which contains power converter arms which are switchable between in each case an AC voltage side and a DC voltage side or connectable to phase lines of an AC voltage power supply system, wherein each power converter arm has a series circuit of switching modules each having a plurality of semiconductor switches and an energy store.

The object of the invention is to propose such a power converter which is as efficient and reliable as possible during operation.

The object is achieved in the case of a power converter in accordance with the art according to the invention by a closed-loop control device which is designed to perform a method according to the invention.

The advantages of the power converter according to the invention can be gleaned in particular from the advantages described in connection with the method according to the invention.

The power converter can be provided, for example, for an HVDC transmission application or else for a FACTS application and in particular may be a modular multilevel converter. The switching modules can be, for example, the half-bridge switching modules or full-bridge switching modules known to a person skilled in the art.

Other features which are considered as characteristic for the invention are set forth in the appended claims.

Although the invention is illustrated and described herein as embodied in a power converter and a method for operating the power converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
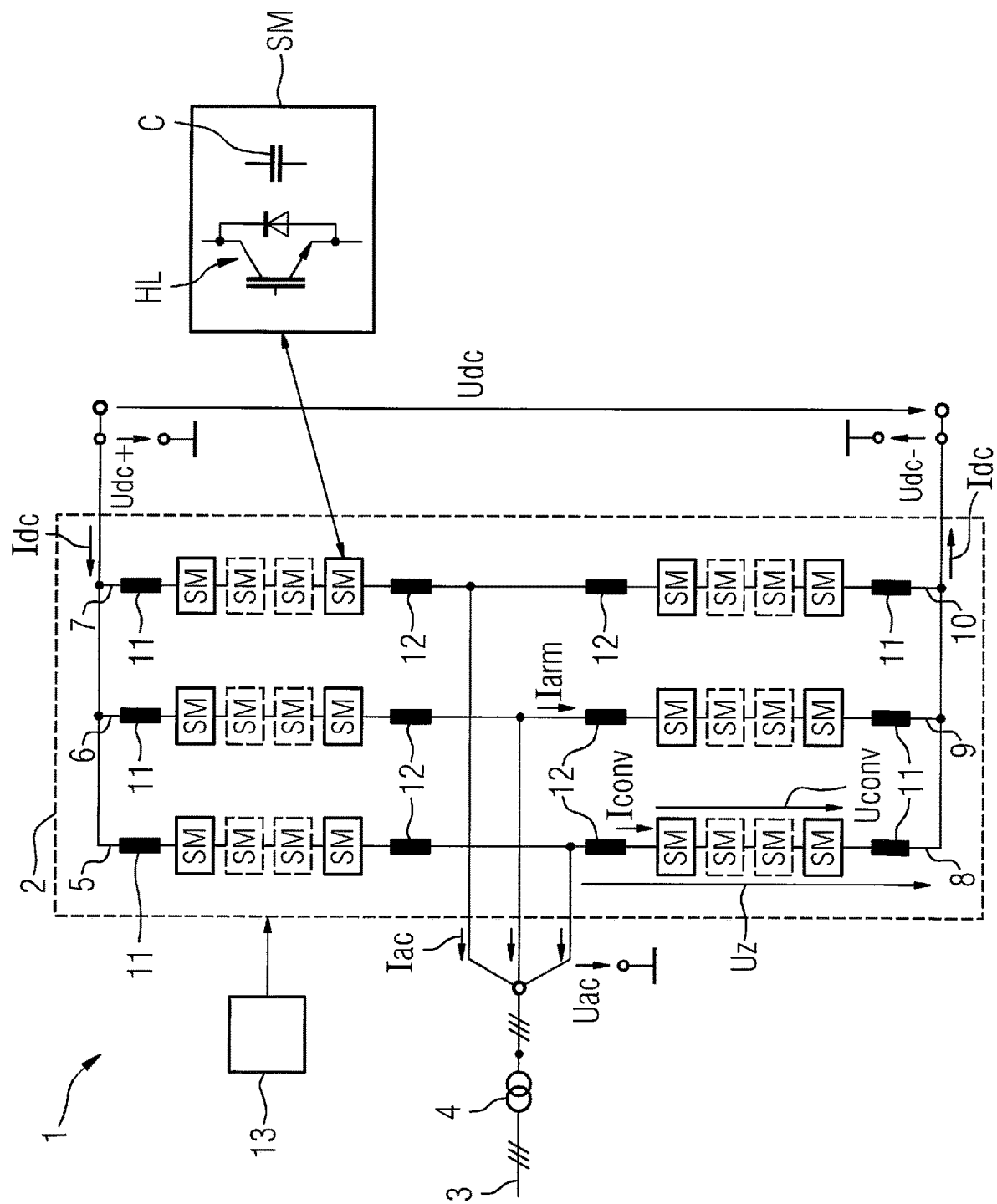
FIG. 1 is a schematic illustration showing a power converter according to the invention.

Referring now to the figures of the drawings in detail and first, particularly to FIG. 1 thereof, there is shown a power converter arrangement 1. The power converter arrangement 1 contains a power converter 2, which is a modular multilevel converter (MMC). The MMC in the example illustrated is configured to convert an AC voltage of an AC voltage power supply system 3 to which the MMC 2 is connected by means of a line transformer 4 into a DC voltage Ude.

The MMC 2 contains six power converter arms 5-10, which are connected to one another in a double-star circuit. Each of the identically configured power converter arms 5-10 contains two arm inductances 11, 12 and in each case one series circuit of two-pole switching modules SM. In the exemplary embodiment illustrated in FIG. 1, all of the switching modules SM are of identical design, which is not necessary generally, however. The number of switching modules SM in each power converter branch 5-10 is also in principle as desired and can be matched to the respective application. The switching modules SM may be, for example, full-bridge switching modules or half-bridge switching modules. Each switching module SM contains controllable semiconductor switches, for example IGBTs or the like (a full-bridge switching module at least four semiconductor switches, a half-bridge switching module at least two semiconductor switches), an energy store (for example in the form of a capacitor) and a control assembly, by means of which the semiconductor switches can be driven. With respect to the design of the mentioned examples of switching modules, reference is hereby made to the abovementioned international patent disclosure WO 2020/125968 A1.

The power converter arrangement 1 or the power converter 2 also contains a central closed-loop control device 13, which is configured to control the MMC 2 (or the control variables) and to drive the switching modules SM. The closed-loop control device 13 receives, from a superordinate entity, presets with respect to the required active power and reactive power, which are converted by the closed-loop control unit into setpoint values of control parameters, for example of voltage and current. The control parameters can therefore in particular be an AC-voltage-side voltage Uac, an AC-voltage-side current Iac, a DC-voltage-side current Idc and/or a DC-voltage-side voltage Udc. In a power converter which is designed as a symmetrical monopole, a voltage Udc+ between the positive DC voltage pole and the ground potential and a voltage Udc− between the negative DC voltage pole and the ground potential can be of significance. In the example illustrated here, the arm current (the current flowing through one of the power converter arms) is in each case the controlled variable and the arm voltage is correspondingly the manipulated variable of the power converter arrangement 1.

Figure 2:
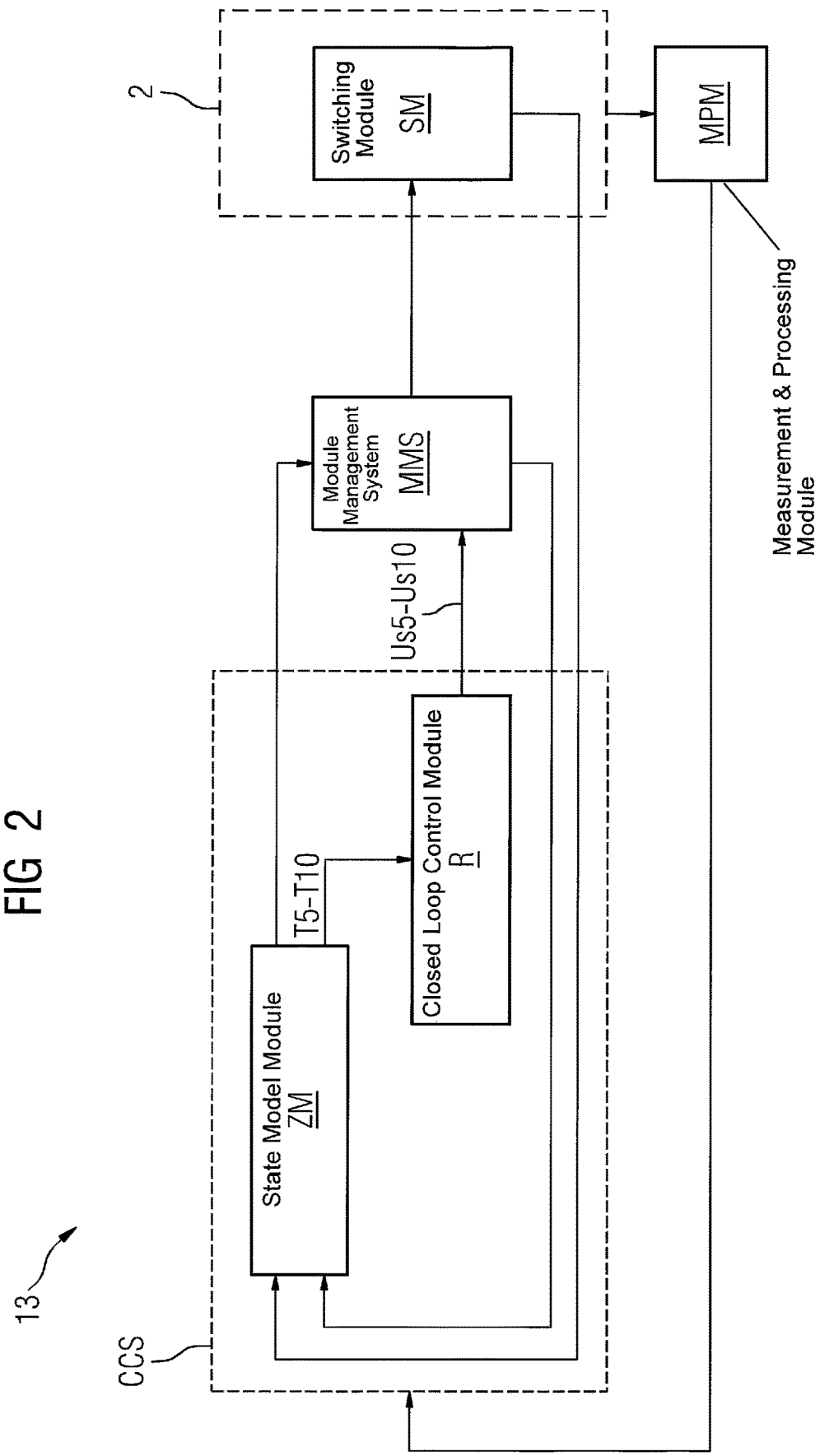
FIG. 2 is a schematic illustration showing a first exemplary embodiment of a closed-loop control device for the power converter according to the invention.

FIG. 2 shows the closed-loop control device 13 for the power converter 2 (for example the power converter 2 in FIG. 1). The closed-loop control device 13 contains a plurality of components. A module management system MMS is assigned to each of the switching modules SM of the power converter 2. The MMS is configured to determine or to receive by transmission switching data of the switching module from the assigned switching module SM and to transmit them to a central current control system CCS. At the same time, measured variables measured at the switching module SM such as the current flowing through the switching module or the voltage present at the energy store of the switching module are recorded and processed by means of a measurement and processing module MPM.

Independently of the implementation of the remaining components, the measured variables measured at the switching module are processed, in particular filtered (for example low-pass filtered) or relieved of noise (by filtering out high-frequency signal components) prior to being passed on or transmitted to the CCS.

The CCS contains a state model module ZM, which does not need to be a separate hardware module in terms of implementation, but can also be implemented as a software function within the controller hardware. A state model of the power converter 2 is implemented in the state model module ZM. The state model can be realized, for example, in the form of one or more differential equations, which can convert calculated input variables into the same output variables. In the example illustrated here, at least the following input variables enter the state model: energy store voltages of all of the switching modules SM of the power converter 2 (these are provided by the MPM), switching states of all of the switching modules SM (these are transmitted by the switching modules) and switching frequencies of all of the switching modules SM (these are determined in the respective MMS and transmitted to the CCS) and arm voltages Uconv and arm currents Iarm of the power converter arms 5-10. (Scalar) temperature values T5-T10 are provided as output variables for each of the power converter arms 5-10 at the output of the ZM. The provision of the temperature values takes place at time intervals of 50 microseconds. Taking into consideration the temperature value, in the example illustrated by virtue of a conversion by means of a linear characteristic, an arm setpoint current limitation value is determined for each power converter arm 5-10. The respective arm setpoint current limitation value is the highest permissible value that a setpoint current value can assume (at the respective time). In addition, in the example illustrated here, the arm setpoint current limitation values are time-integrated so as to form an arm integral value AI5-AI10. By means of a closed-loop control module R (comprising suitable controllers), manipulated voltages Us5-Us10 are determined from the temperature values T5-T10 and the arm integral values AI5-AI10 and transmitted to the respective MMS (wherein a check is performed in the CCS to ascertain whether the respective arm integral value has reached or exceeded the corresponding arm integral threshold value). The respective MMS then converts the manipulated voltages into suitable switching commands for the associated switching modules SM and correspondingly transmits these switching commands to the individual switching modules SM.

Figure 3:
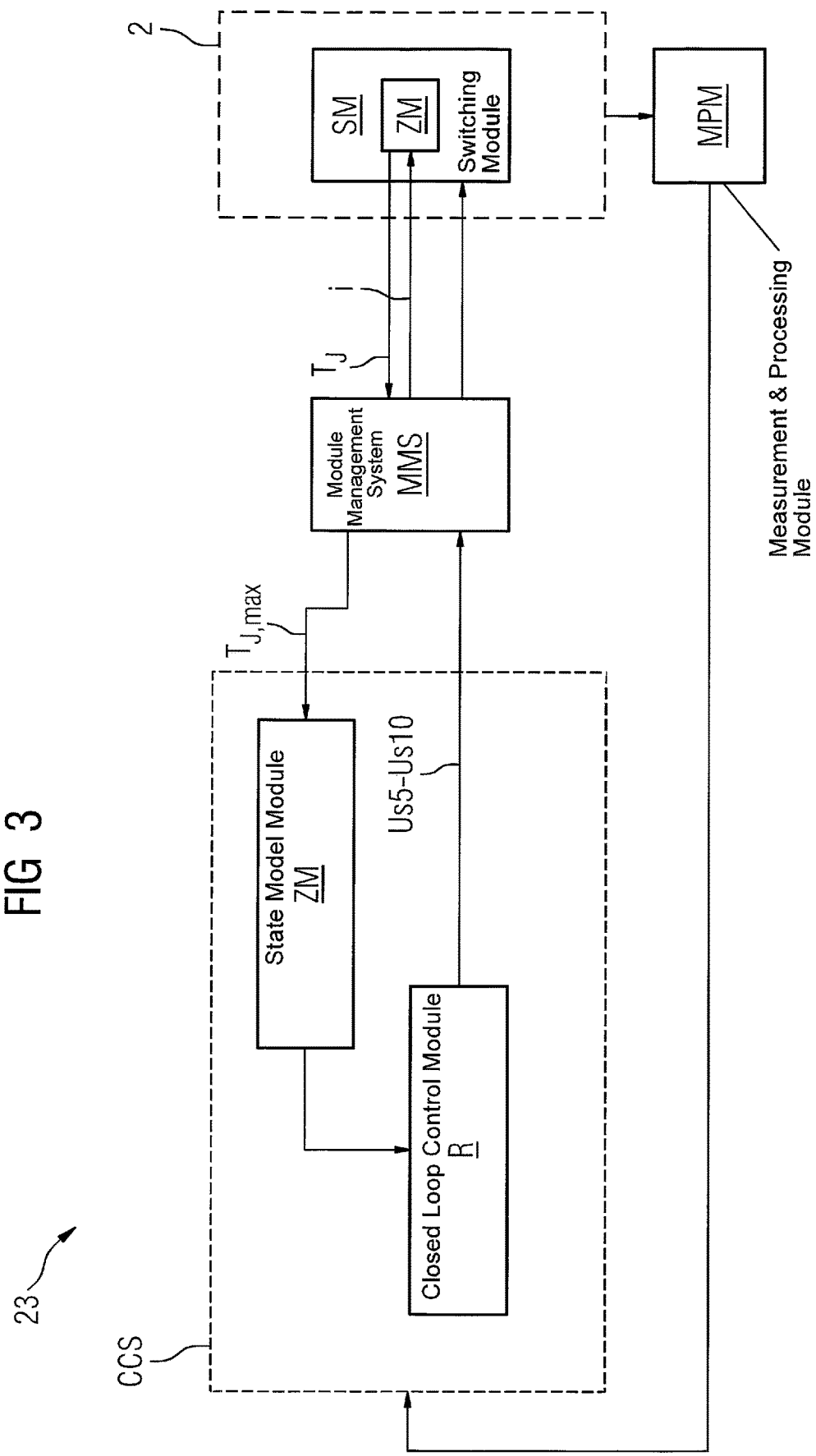
FIG. 3 is a schematic illustration showing a second exemplary embodiment of a closed-loop control device for a power converter according to the invention.

FIG. 3 shows a closed-loop control device 23, which can be used as the closed-loop control device 13 for the power converter 2 in FIG. 1. Identical and similar elements and components are provided with the same reference symbols in FIGS. 2 and 3. In contrast to the exemplary embodiment in FIG. 2, in FIG. 3 an implementation of the state model or the temperature model on module plane is provided. In order to calculate the temperature values Tj, current values are transmitted from the MMS to the switching modules SM or to the state model module ZM which is integrated in the switching module SM. The calculated temperature values Tj of each individual switching module SM are first transmitted to the MMS and sorted by the MMS in accordance with the example in FIG. 3. Then, the maximum value Tj,max, obtained by the sorting, of the temperatures Tj is transmitted to the CCS. By means of a suitable logic module 24 of the CCS, the setpoint current limitation values are determined and passed on to the closed-loop control module R. The implementation of the state model on switching module plane requires markedly increased hardware demands on the module assemblies owing to the high complexity of the temperature model.

Figure 4:
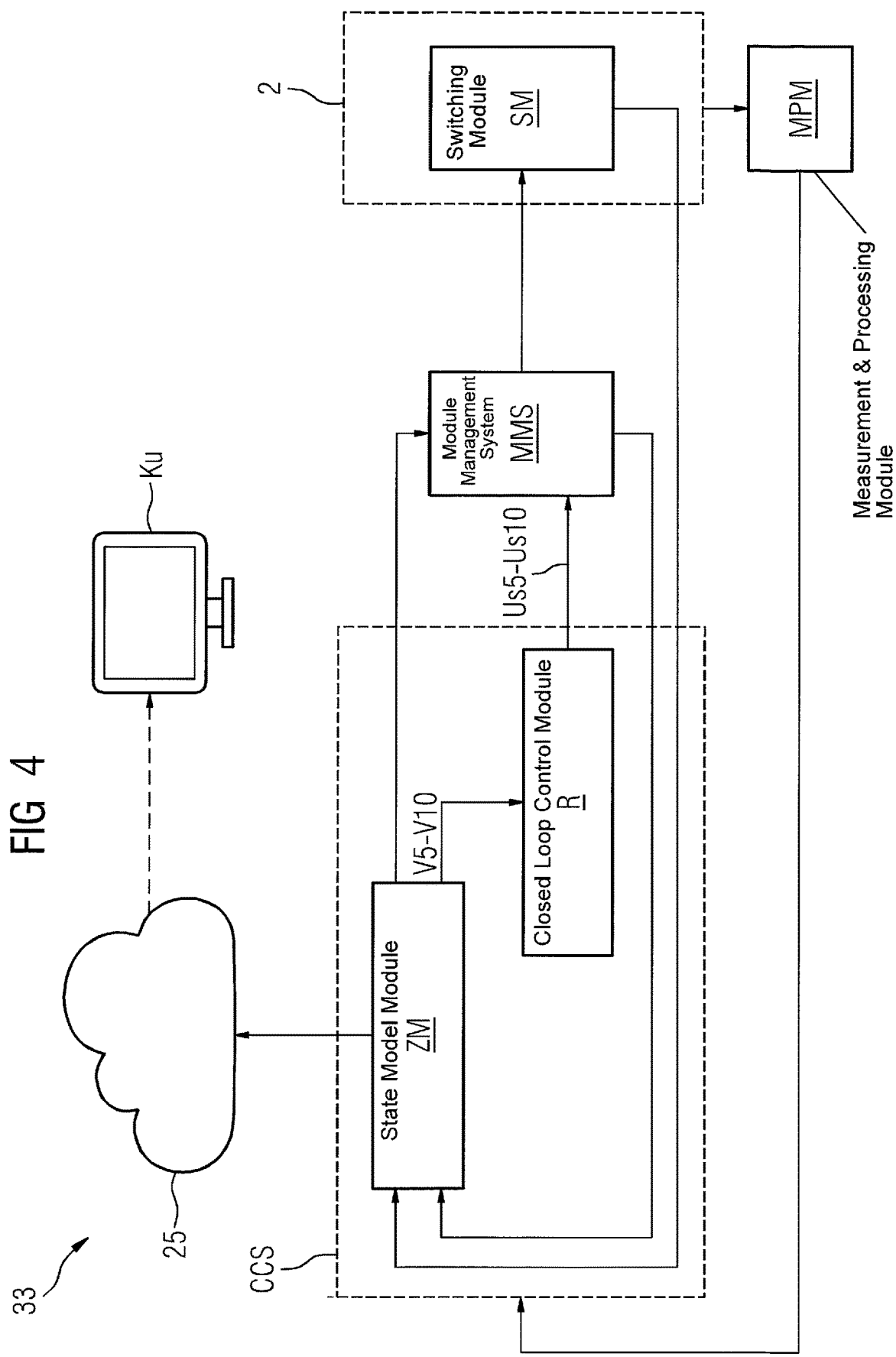
FIG. 4 is a schematic illustration showing a third exemplary embodiment of a closed-loop control device for a power converter according to the invention.

FIG. 4 shows a closed-loop control device 33, which can be used as the closed-loop control device 13 for the power converter 2 in FIG. 1. Identical and similar elements and components are provided with the same reference symbols in FIGS. 2 and 4.

By means of the state model in the state model module ZM, a loss value is provided for each power converter arm by virtue of semiconductor losses of the semiconductor switches of the switching modules being estimated by calculation. In this case, a total loss value V5-V10 for each power converter arm 5-10 (cf. FIG. 1) is provided at the output of the state model module ZM, which total loss value comprises a switching loss value, a wheeling loss value and an auxiliaries service loss value. The calculated total loss values V5-V10 are transmitted to the module management system MMS and at the same time to the closed-loop control module R.

By means of the closed-loop control module, arm manipulated voltages Us5-Us10 are determined for each power converter arm 5-10, wherein the determination of the arm manipulated voltages is performed taking into consideration the total loss value thereof. In particular, the closed-loop control module R is designed to switch between two operating modes depending on the total loss values: a continuous operation mode, in which the total loss value is minimized, and a loading mode, in which a loading of the semiconductor switches is reduced. The MMS is correspondingly designed to convert the arm manipulated voltages into suitable switching commands for the individual switching modules SM in accordance with the preset operating mode. When the switching commands are established by the MMS, in addition the total loss values V5-V10 are used as an optimization criterion, i.e. the choice of the next switching modules SM to be switched is dependent (in particular also) on the criterion of the optimization or minimization of the respective total loss V5-V10.

The calculation of the losses takes place, for example, using identical methods and using the same input parameters as for the design and loss evaluation of the entire installation for the customer. In an operational test, which can take place, for example, in a cloud 25 outside the power converter arrangement 1, the total losses calculated in real time and transmitted to the cloud 25 are therefore compared with values determined using measurement technology (for example calorimetrically or via the electrical injection). The resultant comparison results verify and confirm in a suitable manner additionally the correctness of the theoretical figures in respect of the customer and therefore result in a higher degree of transparency in respect of the internal calculation methods.

At the same time, the concept also provides the possibility of being able to represent the losses in real time at any time and to be able to make these available to a customer Ku as well. Compensation with losses of other power converter arrangements is likewise possible, as a result of which the obtained real-time data can be used for improving operating modes and algorithms. Also, the knowledge of the present semiconductor losses enables optimization on station level, such as, for example, by adaptation of the cooling circuit, adaptation of the setpoint values, etc.

Figure 5:
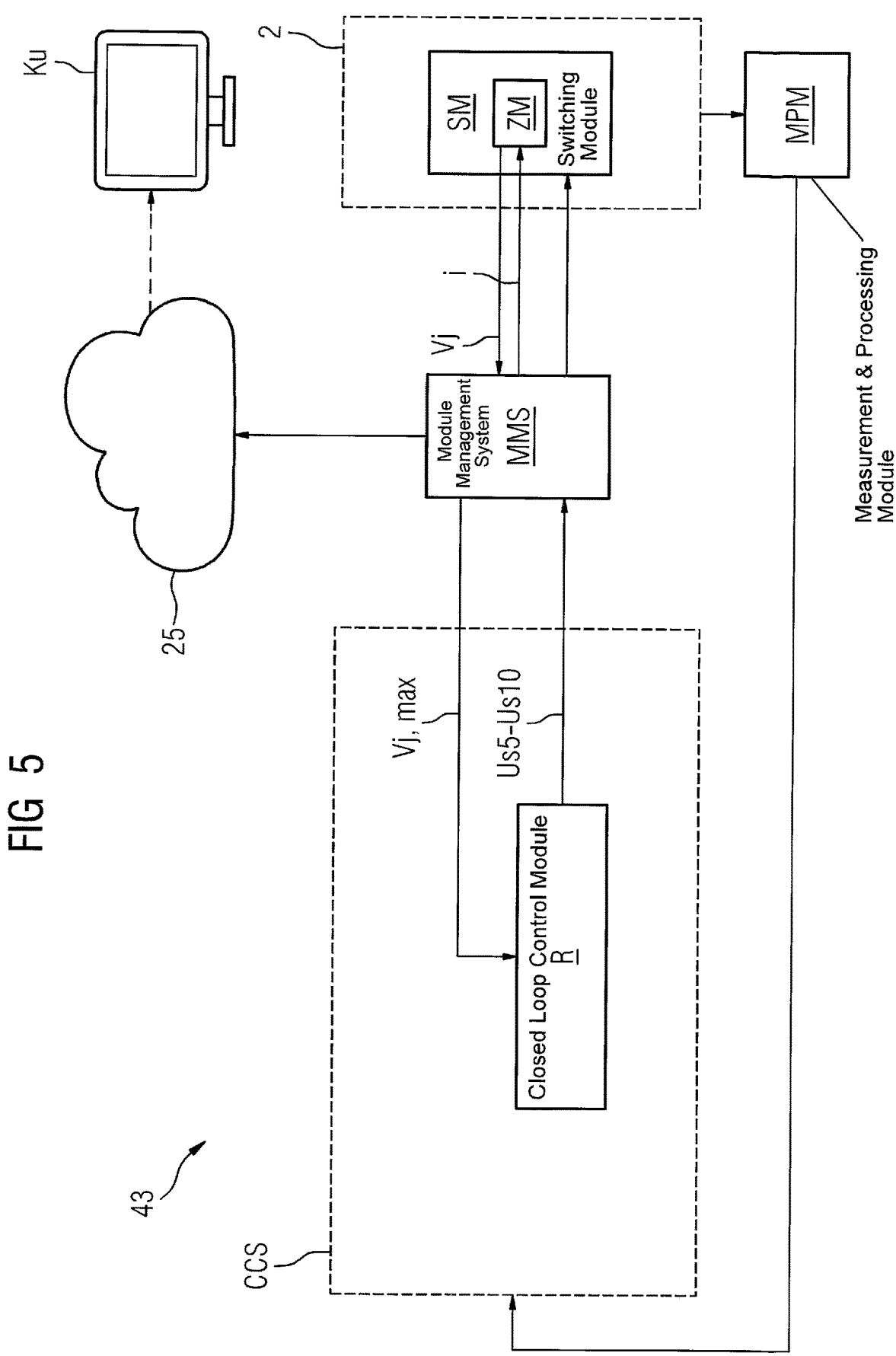
FIG. 5 is a schematic illustration showing a fourth exemplary embodiment of a closed-loop control device for a power converter according to the invention.

FIG. 5 shows a closed-loop control device 43, which can be used as the closed-loop control device 13 for the power converter 2 in FIG. 1. Identical and similar elements and components are provided with the same reference symbols in FIGS. 2, 4 and 5. In contrast to the exemplary embodiment in FIG. 4, in FIG. 5 an implementation of the state model or the temperature model is provided on module plane. The calculated semiconductor losses (total losses Vj) of each individual switching module SM first need to be sorted by the MMS, and then the thereby determined maximum value Vj,max needs to be transmitted to the CCS. Owing to the high degree of complexity of the loss model, this requires very high hardware demands on the module assemblies and drastic changes to the transmitted signals.

The invention claimed is:

1. A method for operating a power converter having power converter arms, each of the power converter arms having switching modules each with a plurality of semiconductor switches and an energy store, which comprises the steps of:
    determining a temperature value for the power converter on a basis of a state model of the power converter;
    determining a setpoint current limitation value taking into consideration the temperature value;
    determining a setpoint current value taking into consideration the setpoint current limitation value;
    calculating a temperature value for a power converter arm of the power converter arms;
    determining an arm setpoint current limitation value for the power converter arm depending on the temperature value for the power converter arm; and
    determining an arm setpoint current value taking into consideration the arm setpoint current limitation value, wherein the temperature value for the power converter arm, the arm setpoint current value, an arm actual current value and/or the arm setpoint current limitation value or a variable derived therefrom is time-integrated so as to form an arm integral value, wherein, when the arm integral value reaches or exceeds a predetermined arm integral threshold value, a protective measure is initiated for protecting the power converter.

2. The method according to claim 1, wherein the state model takes into consideration at least the following power converter variables when calculating the temperature value:
    energy store voltages;
    switching states and switching frequencies of at least some of the switching modules; and
    an arm voltage and an arm current of the power converter arm.

3. The method according to claim 1, which further comprises performing the step of calculating the temperature value repeatedly at time intervals of less than 1 s.

4. The method according to claim 3, which further comprises determining the arm setpoint current limitation value on a basis of a temperature/current characteristic and/or temperature control.

5. The method according to claim 1, which further comprises providing a loss value for each of the power converter arms by means of the state model, wherein the loss value is a switching loss value, a wheeling loss value, an auxiliaries service loss value or a total loss value.

6. The method according to claim 5, which further comprises determining in each case one arm manipulated voltage for each of the power converter arms taking into consideration the loss value thereof.

7. The method according to claim 6, which further comprises operating the power converter in a continuous operation mode, in which the loss value is minimized, or in a loading mode, in which loading of semiconductor components of the switching modules is reduced.

8. The method according to claim 5, which further comprises:
    determining associated arm manipulated voltages from arm setpoint current values and measured arm actual current values by means of a controller or closed-loop control module; and
    establishing switching commands for the switching modules from the arm manipulated voltages, wherein when the switching commands are established, the loss values are used as an optimization criterion.

9. The method according to claim 8, which further comprises establishing the switching commands for the switching modules from the arm manipulated voltages using a balancing algorithm for balancing energy store voltages.

10. The method according to claim 1, which further comprises performing the step of calculating the temperature value repeatedly at time intervals of less than 100 microseconds.

11. The method according to claim 7, wherein the semiconductor components are semiconductor switches.

12. A power converter, comprising:
power converter arms each having switching modules with a plurality of semiconductor switches and an energy store; and
a closed-loop control device configured to perform the method according to claim 1.

* * * * *